April 29, 1958 H. A. SCHMIDT 2,832,308
ARTICLE SPRAYER
Filed May 18, 1956 8 Sheets-Sheet 1

INVENTOR.
Herman A. Schmidt
BY
Donald P. Smith
Attorney.

April 29, 1958 H. A. SCHMIDT 2,832,308
ARTICLE SPRAYER
Filed May 18, 1956 8 Sheets-Sheet 2

Fig 2

INVENTOR.
Herman A. Schmidt
BY
Donald P. Smith
Attorney.

April 29, 1958

H. A. SCHMIDT 2,832,308

ARTICLE SPRAYER

Filed May 18, 1956

INVENTOR.
Herman A. Schmidt
BY
Donald P. Smith
Attorney.

April 29, 1958   H. A. SCHMIDT   2,832,308
ARTICLE SPRAYER

Filed May 12 1956   8 Sheets-Sheet 5

INVENTOR.
Herman A. Schmidt
BY
Donald P. Smith
Attorney.

April 29, 1958

H. A. SCHMIDT 2,832,308

ARTICLE SPRAYER

Filed May 18, 1956

INVENTOR.
Herman A. Schmidt
BY
Donald P. Smith
Attorney.

United States Patent Office 2,832,308
Patented Apr. 29, 1958

2,832,308

ARTICLE SPRAYER

Herman A. Schmidt, Washington, D. C., assignor to ACF Industries, Incorporated, New York, N. Y., a corporation of New Jersey Application May 18, 1956, Serial No. 585,705

13 Claims. (Cl. 118—11)

The present invention relates to a device for the coating of a plurality of objects and more particularly to a machine for automatically spraying such objects which have flat or substantially flat surfaces thereon, whereby to apply thereto a metallized coating which is used in subsequent processes in forming such objects into devices for the support of electrical components.

Among the broad objects of the invention is to provide a novel spraying mechanism for automatically coating the surfaces of an article or a plurality of articles constrained to move in a given path relative to a coating device as on a traveling conveyor, and thereafter turning the article to present a successive surface to the coating device.

It is another object of the invention to provide an apparatus that will uniformly and efficiently coat a great plurality of articles in a minimum of time.

More specifically the invention comprehends a reciprocating holder mounted for motion in a straight line parallel to the orifice of a spray device and arranged to be turned through an arcuate path at the end of motion in one direction and prior to start of motion in the opposite direction. Means are included to control the operation of the spray device so that the discharge is suspended during the time interval that the holder is turning and reversing its direction of motion. Among the advantages in this arrangement is the economical use of the spraying material and the great number of articles which may be processed in a short time.

In the electrical art it is frequently desirable to bond a conductive member, such as a tin coated copper strand to a ceramic element. It has been found that in order to successfully bond the strand it is necessary to first apply a coating of silver to the ceramic body which adheres thereto and provides a surface which will readily accept solder to cause adhesion between the strand and the body. The invention disclosed herein reveals an adroit solution to the problem of applying such a coating to selected portions of a ceramic surface which is effective in operation and economical in use.

The finished product output of the machine to be described herein is used inter alia, in the manufacture of modules, which are members comprising a series of ceramic wafers having notches formed therein and disposed in spaced parallel planes having an assemblage of conductive risers secured by soldering to the sprayed metal in the edged notches and running perpendicular to the planes of the wafers. As will be more fully pointed out hereinafter the wafer must be edged coated in part only, and in order to avoid over-spraying with consequent loss of material and danger of providing unwanted conductive paths the holders are formed to shield those parts of the wafer edges upon which no metal is to be deposited.

Summarily stated the invention provides an apparatus for applying a coating to a portion of the exterior of planar articles and consists of a spray device with an orifice formed therein to direct a discharge jet, an arrangement of planar wafers fixed together in parallel planes to present the respective edges to the discharge jet, the holder formed to shield a portion of the object from the jet, a conveyor for reciprocating the holder in a plane spaced from the discharge jet, and a control circuit operative upon movement of the holder to a number of predetermined positions to terminate the discharge jet and turn the holder to present the respective successive edges to the discharge jet.

It is still another object of the invention to provide a machine of this class that will operate continuously over long periods of time without interruption for adjustment or repair whereby articles to be later processed in a manufacturing line may be coated at the same speed as the other operations of the line are performed.

A further and more specific object of the invention is to provide means for disabling the discharge jet upon completion of one reciprocating stroke and maintaining the same disabled during subsequent motion and thereafter reestablishing the jet on the next travel to thereby coat only alternate edges of objects presented thereto.

An illustrative embodiment of the invention is shown in the accompanying drawing wherein.

Figure 1:
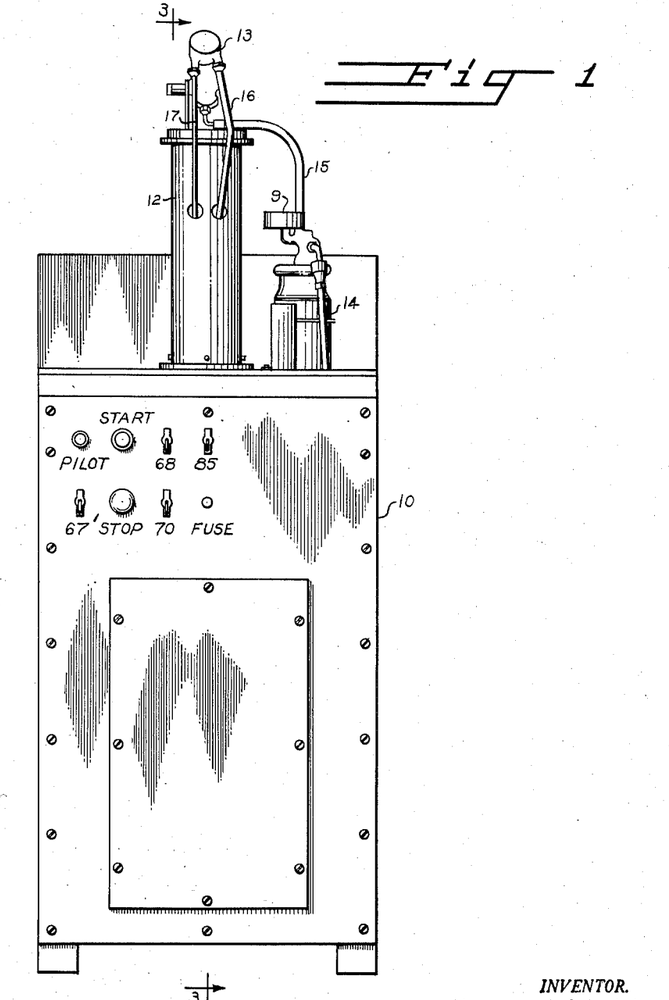
Figure 1 is a front elevation view showing the operator's controls on the panel face.
Figure 2:
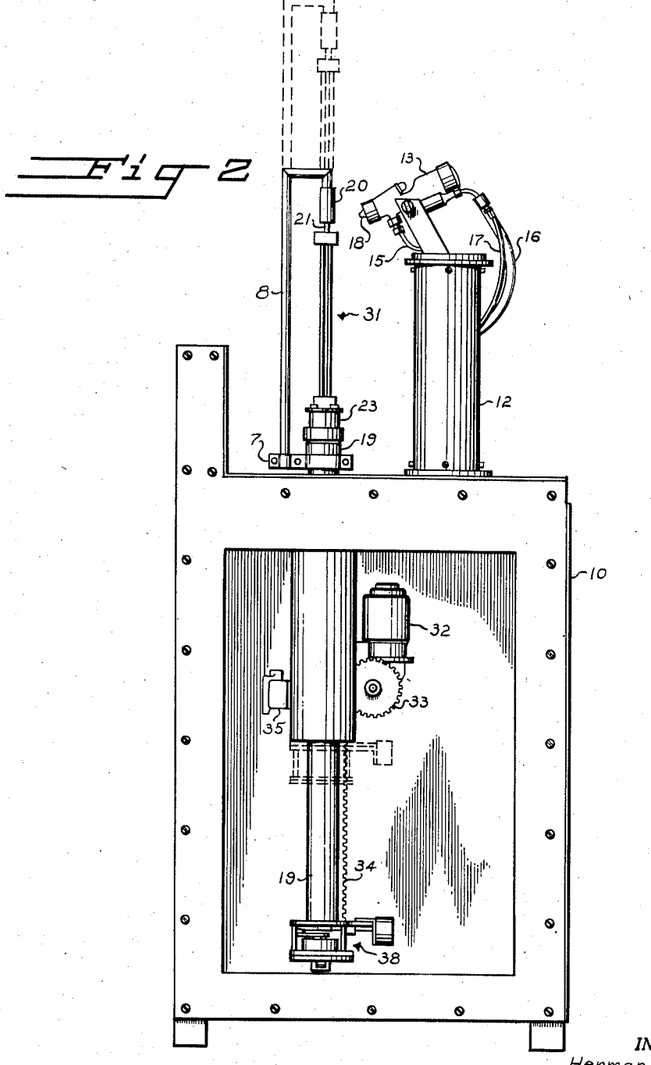
Figure 2 is a side elevation view with a panel removed to show the internal construction.

The machine as contemplated by the invention includes a cabinet 10 best seen in Figures 1 and 2 having disposed on the front surface thereof a plurality of manually operated switches and indicating lights which will be explained with more particularity with reference to the circuit diagram of Figure 18, and having on the top a standard 12 adapted to fix a spray device 13 having an orifice 18 substantially as shown. A container 14 to receive the material to be sprayed is bolted to the cabinet top and a gage 9 is provided to indicate to the operator the condition of the pneumatic supply. Conduits 15, 16, and 17 are used to interconnect the spray device with the air and paint supplies in the usual manner.

Figures 4, 5, 6:
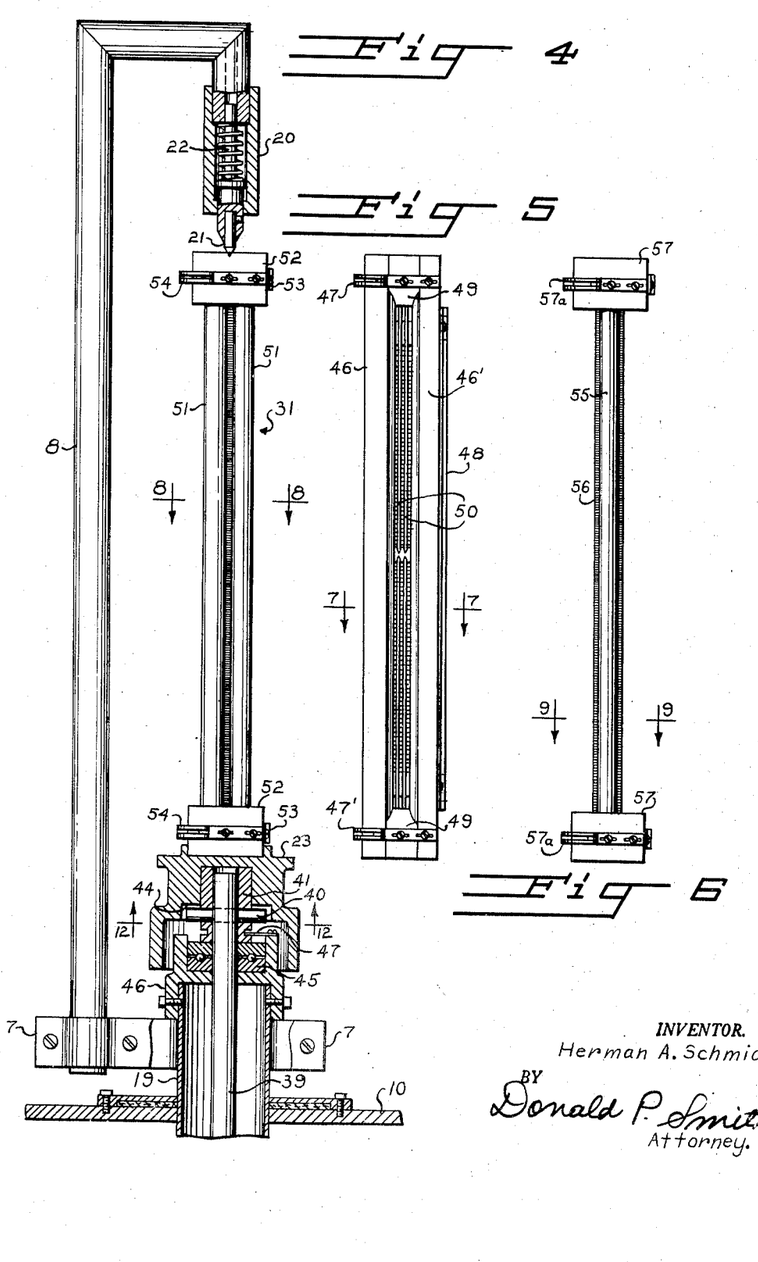
Figure 4 is an enlarged elevation of a detail of Figure 3 showing one embodiment of a holder device.
Figure 5 is an elevation showing a second embodiment of the holder device.
Figure 6 is an elevation showing a third embodiment of the holder device.

Mounted in a plane spaced from the spray device orifice is a reciprocating mechanism adapted to hold in juxtaposed relation a plurality of articles to be coated. As is best seen in Figure 4 a member 8 in the form of an inverted L is secured by clamp 7 to a cylinder 19 arranged to pass through an aperture formed in the cabinet top.

The upper end of the L shaped member 8 has a sleeve 20 fitted over the terminal portion and includes a pin 21 extending from the end thereof and a compression spring 22 within the same to urge between the member end and the sleeve substantially as thereshown. A head 23 supported on the upper end of cylinder is spaced from and coaxially aligned with the pin. As is seen in Figures 2 and 4 a holding device 31 adapted to receive an assemblage of articles to be coated is retained between the spring urged pin and the head 23. Depending upon the type of article to be coated and the portion thereof to be shielded from the discharge jet a number of variations of the holding device are here revealed.

Figure 12:
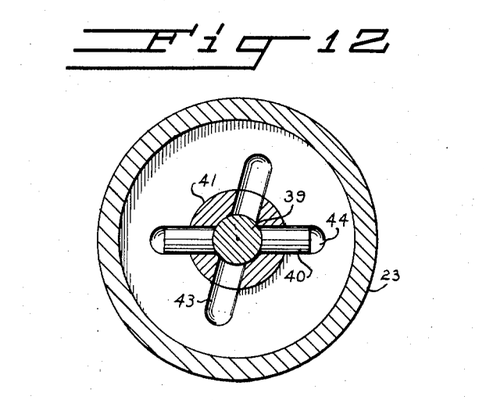
Figure 12 is a bottom view of a detail of the reciprocating device of Figure 4 taken on line 12—12 thereof and looking in the direction of the arrows.

A motor 32 having pinion 33 secured to the shaft thereof is mounted inside the cabinet and threadedly engages rack 34 which is affixed to cylinder 19. It will be readily apparent that energization of the motor will move the cylinder and its attached elements in a plane spaced from and opposed to the spray device orifice. A plurality of limit switches 35 and 36 and are disposed along the path of travel of cylinder 19 and actuator 37 is bolted thereto to engage against the limit switch fingers upon motion of the cylinder to a plurality of predetermined positions. An indexing mechanism shown generally as 38 is depended upon to rotate the holding device at the end of each reciprocating stroke to present successive article surfaces to the jet emanating from the spray device orifice. A shaft 39 disposed in the axis of symmetry of cylinder 19 is driven from the indexing device, and has secured thereto a pin 40 piercing the same adjacent the upper end. Pin 40 is depended upon to affix a boss 41 to the shaft and the turning head 23 rest over the boss and has bottom grooves 43 and 44 (Figure 12) formed therein to receive in part at least the pin, whereby rotation of shaft 39 imparted by the indexing mechanism is transmitted to the head. A ball bearing 45 is provided between cylinder cap 46 and shaft 39 to preserve the alignment thereof and to carry the thrust of the holder. Boss 41 is retained against the upper race of the ball bearing by detent 47.

Summing up to this point the operation of the mechanism is as follows:

As determined by the electrical and pneumatic control circuits the spray device will be actuated at the beginning of a coating operation and the holder will be raised in a path parallel to the discharge jet until it reaches a predetermined position. Arrival at such position will initiate an indexing impulse which will rotate the holder to present a succesive collective surface to the discharge jet for the next path of motion past the orifice. The operation of the spray device is interrupted during the time interval required for turning the holder. A circuit actuator also is provided for sensing turning functions in number in accordance with the number of sides of the article to finally terminate the operation when all edges have been presented in turn to the coating device.

Figure 7:
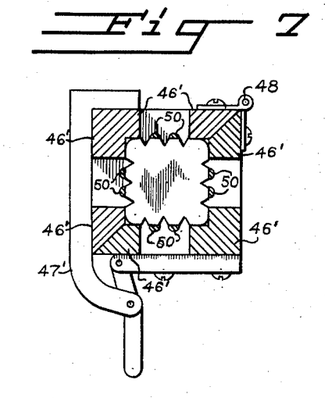
Figure 7 is a section taken on line 7—7 of Figure 5 and looking in the direction of the arrows.
Figure 10:
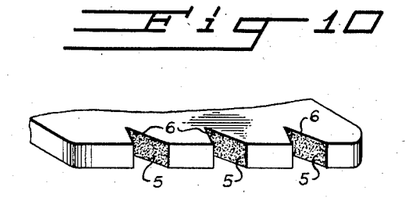
Figure 10 is a perspective view of a portion of a wafer showing the kerfs formed in the surfaces thereof and carrying a coating in the kerfs.

Figures 5, 7 and 10 taken together show the structures used to tightly hold a series of ceramic wafers having kerfs 6 formed in the edges. These are the wafers referred to above which are used to form the planar supporting surfaces in the module and the conductive risers are seated in the kerfs and are soldered thereto provide interconnection between components on the wafers and external circuits. Figure 10 illustrates a wafer which has received the desired silver edge coating 5. The holder, as seen in Figures 5 and 7 comprises a plurality of bar members 46' disposed to form a square in plan. Diametric opposed bars are divided as shown whereby the holder may be opened by the use of pivot lock member 47' and hinge member 48 to receive the wafers substantially as there shown. Aprons 49 are affixed at the top and bottom of the bars and have extending between them a series of rods 50 to rest against the wafer edge portion between adjacent notches to shield the same from the discharge jet. This shielding is important in order to prevent the formation of unwanted conductive paths between conductive risers in the final assembled form. In order to prevent the discharge jet from forming a pad of excessive sprayed material at the apex of the kerfs it has been found necessary to displace the holder from a line normal to the axis of the discharge device orifice. This is accomplished by groove 43 in the bottom of head member, previously referred to in connection with Figure 12, to receive pin 40 whereby the holder and wafers are presented inclined to the orifice axis at an angle of approximately 15 degrees. This allows the discharge jet to impinge against one surface of the kerfs and upon completion of the full spraying cycle the holder is reversed end for end by the operator and the other surface of the kerf is exposed to the jet for coating.

Figure 8:
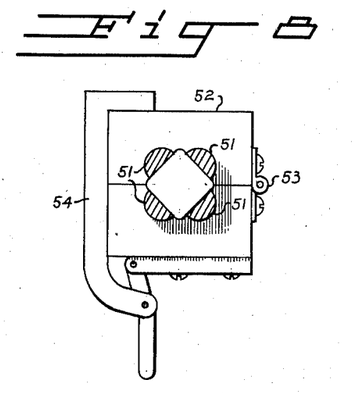
Figure 8 is a section taken on line 8—8 of Figure 4 and looking in the direction of the arrows.
Figure 11:
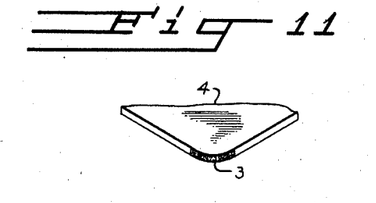
Figure 11 is a perspective view of a portion of another wafer carrying a partial coating.

Figures 8, and 11 show a wafer 4 which has received a coating 3 at the corners only. This coating is used in the fabrication of miniature ceramic mounted condensers and will receive solder to connect the condenser into an external circuit. The holder of Figures 4 and 8 comprises four bar members 51 joined at the top and bottom and having portions thereof cut away to receive and shield the square condenser wafer except the corners thereof. Joining elements 52 at the top and bottom of the bars are divided and hinged as 53 at whereby lock member 54 can be depended upon to join the same for securing the condensers into the holder.

Figures 9, 13:
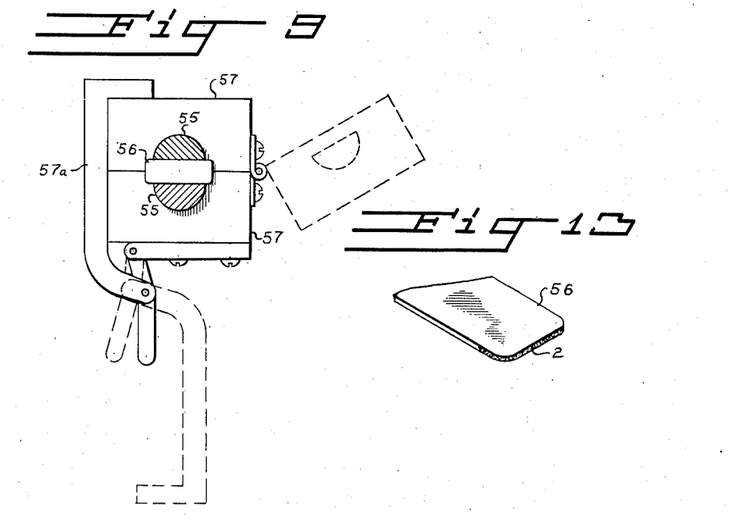
Figure 9 is a section taken on line 9—9 of Figure 6 and looking in the direction of the arrows.
Figure 13 is a perspective view of a portion of an article showing the manner in which it is to be coated.

Figures 6, 9 and 13 illustrate a ceramic wafer member 56 which has received a coating 2 of metallic silver material at the diametrically opposed ends for the purposes of receiving a component such as a resistor in bridging relationship between the two coatings. The holder, as seen in section in Figure 9 comprises a bar member 55 divided through a plane piercing its center and spaced to receive the assemblage of juxtaposed wafers. Hinged openable joining members 57 are affixed at the top and bottom of the divided bar substantially as shown. A locking device 57a is utilized to hold members 57 together and the wafers may be removed when one of the members 57 is pivoted to the position shown in phantom. In order to apply the coating at two edges only of a four-sided object a control option is included in the wiring diagram to disable the spray device during alternate paths of travel. When wafers as illustrated in Figures 11 and 13 are to receive the coating the axis of symmetry of the spray device orifice is disposed normal to the edge and pin 40 is received in groove 44.

Figure 3:
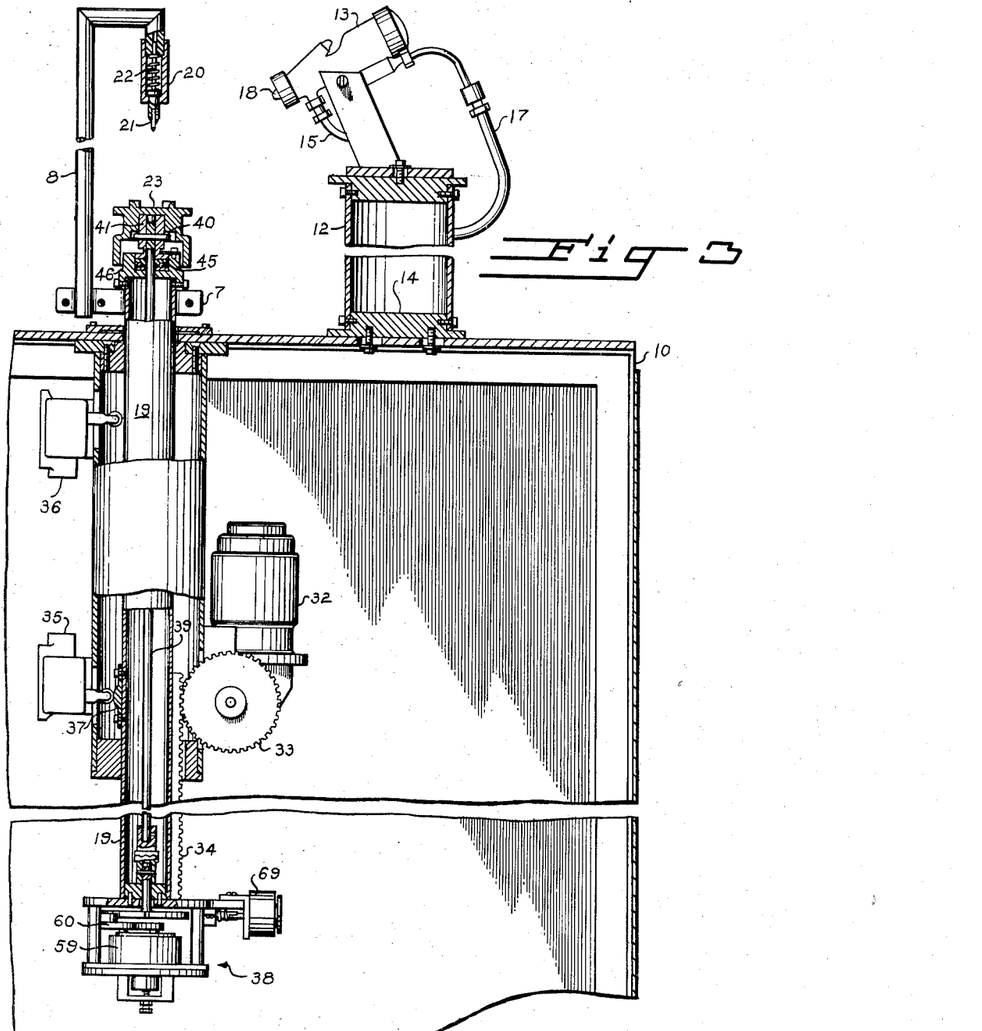
Figure 3 is an enlarged elevation partly in section taken on lines 3—3 of Figure 1 and looking in the direction of the arrows.
Figure 14:
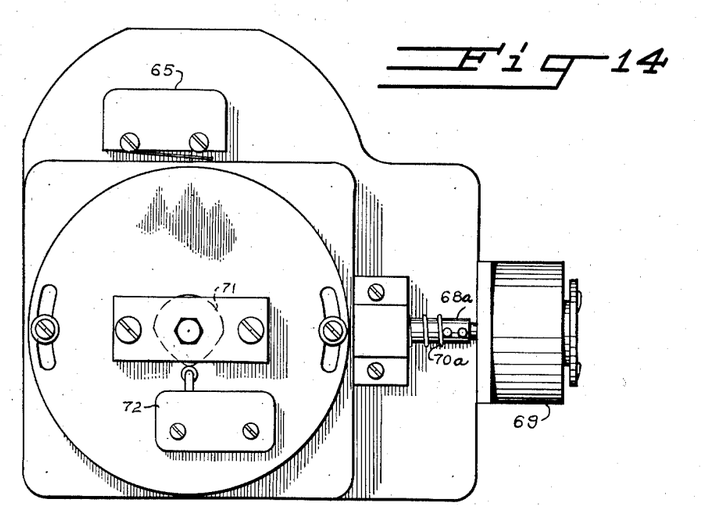
Figure 14 is a bottom view showing the exterior of the indexing structure.
Figure 15:
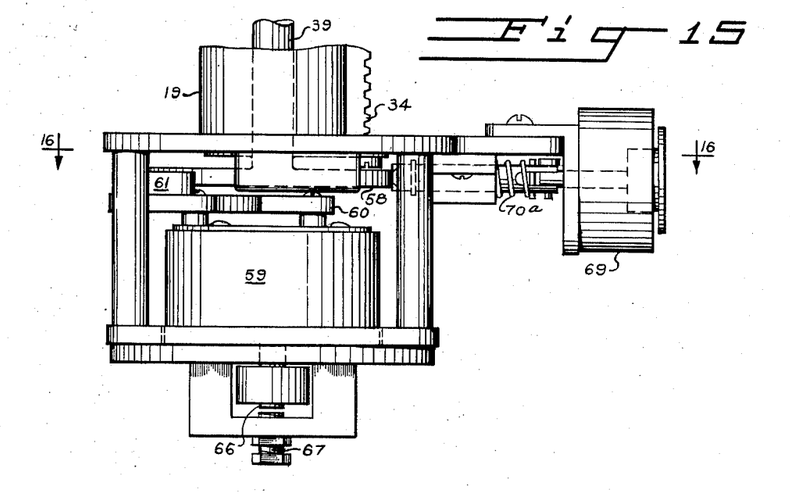
Figure 15 is an elevation view showing the construction of the indexing structure.
Figure 16:
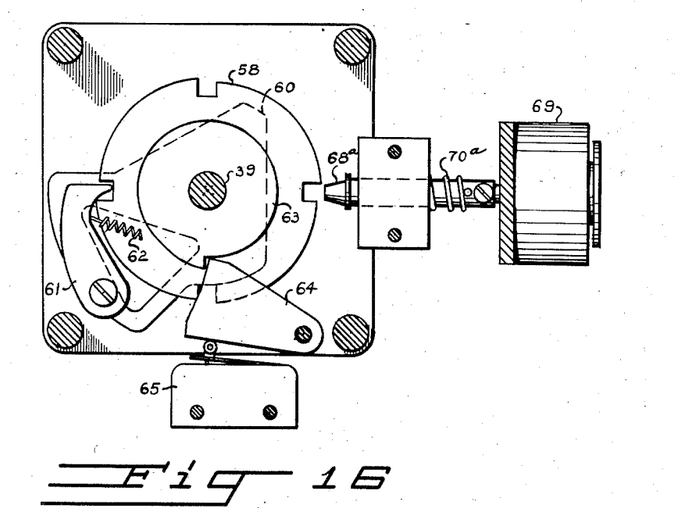
Figure 16 is a section taken on line 16—16 of Figure 15 and looking in the direction of the arrows.

The indexing mechanism shown as 38 in Figure 3 for turning the holders is illustrated in detail in Figures 14, 15, and 16. Shaft 39 is keyed, or otherwise firmly joined to a notched disc 58. A rotating solenoid 59 is mounted beneath the disc (Figure 15) and is so arranged that application of voltage thereto will produce high torque turning movement. Plate 60 is secured to the output shaft of the solenoid and has pawl 61 hinged thereto. A spring 62 normally urges the pawl toward the center of the assembly to cause engagement within one of the notches formed in the disc as will be seen by reference to Figure 16. Cam 63 is secured to shaft 39 for rotation therewith and operates to urge cam follower 64 against normally closed switch 65 upon 360 degree rotation. The end of the rotating solenoid shaft 66 is brought out through the bottom of the indexing casing and is arranged concentric with detent bar 67 which is depended upon to positively stop the arcuate motion of the solenoid. As is well known a rotating solenoid depends upon thrust between an iron core movable in a powerful electromagnetic field and a cam system of having roller bearing to change the thrust into rotation with resultant solenoid shaft displacement. The type of solenoid here used will move its shaft axially a space of approximately of 1/16 inch so that a detent affixed at the desired termination of shaft travel will preclude any further solenoid core rotation. Such a structure is conventional in the art and is illustrated in Patent No. 2,496,880, dated February 7, 1950.

A shot-pin 68a is arranged to be moved by solenoid 69 into positive locking engagement within a notch in the disc to hold the assembly fixed against motion and ready for the reciprocation of the holder. It should be noted that the shot-pin here disclosed moves into locking relation only upon energization of thrust solenoid 69 and it is removed therefrom by the urging of compression spring 70a. The operation of this organization is as follows: The several parts are shown in Figure 16 as they appear upon completion of the coating operation. When it is time to turn the holder a signal initiates voltage application to rotating solenoid 59 which through member 60 and pawl 61 turns disc 58 and shaft 39 at high speed. After disc 58 has turned through approximately 40 degrees solenoid 69 is energized by cam 71 closing switch 72 and the shot-pin engages and rides against the edge of the disc; it is here retained until the approaching notch arrives at the desired position opposed thereto whereupon it seats firmly in the notch and holds the shaft fixed. Rotating solenoid 59 moves until its lower shaft projection 66 engages against detent bar 67 whereupon its motion is terminated and a self-contained spring (not shown) returns it to normal position. Pawl 61 cams itself out of the notch and reseats itself in the successive notch ready for the next operation. Upon return of the solenoid to normal position shot-pin solenoid 69 is deenergized by switch 72 and the shot-pin is removed from engaging relation with the disc. Cam 63 is arranged to actuate cam follower 64 once in a 360 degrees cycle to thereby actuate cycle stop switch 65 to finally disable the circuit in preparation for the next complete coating operation.

Figures 17, 18:
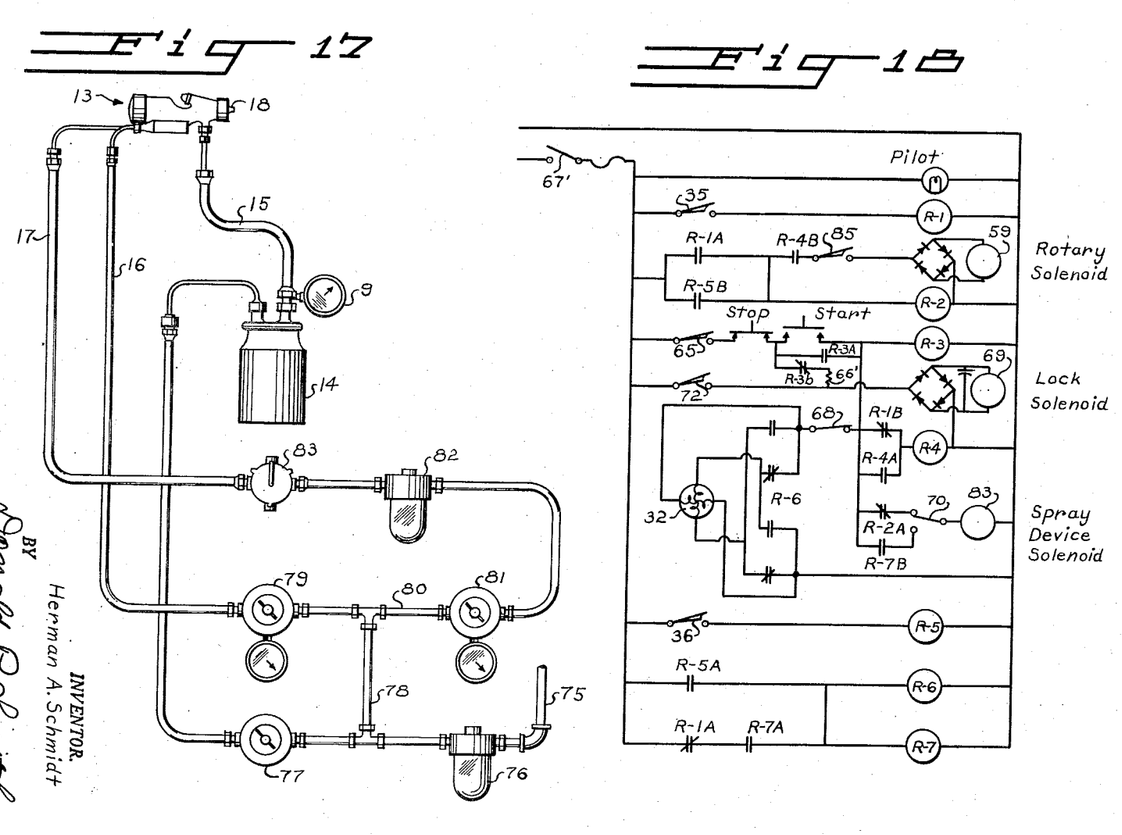
Figure 17 is a diagram showing the pneumatic system used in the machine.
Figure 18 is a schematic wiring diagram showing the electrical controls utilized herein.

Referring now to Figure 18 it will be noted that the control circuit depends primarily for action upon actuation of limit switches 35 and 36 which are momentarily closed when cylinder 19 moves to a plurality of predetermined positions. The rotary solenoid 59 has connected in series therewith contacts R1A and R5B connected respectively in parallel. The lock solenoid is energized through rotate lock switch 85 and motor 32 is reversed by the contacts actuated by relay R3. Relay R3 has a double set of contacts one to lock itself across the line in the usual manner and the other to connect energy to the lock solenoid through a resistor 55'. When the machine is inactive between coating cycles a reduced voltage is applied through resistor 66' to lock solenoid 69 to thereby introduce shot-pin 68a into the notch disc 58 to hold shaft 39 stationary while the operator is transferring the holder. This is done to prevent displacement of the shaft from its desired position with respect to the spray orifice.

With power switch 67' closed and motor switch 68 closed together with rotate switch 85 and paint selector switch 70 placed in the ninety degree operation (up) position, the start button is pressed to energize relay R3. Contacts R3A close and R3B open; contacts R3A applies energy to motor 32 through switch 68 and the contacts of reversing relay R6 and the reduced voltage is removed from the lock solenoid 69 whereby the shot-pin withdraws from the notched disc. Energy is applied through contact R1B to the coil of R4 which locks itself in by contact R4A and set up a circuit through R4B in series with manually operated rotate switch 85 for subsequent energization of the rotary solenoid 59. Energy is also applied through normally closed contact R2A and switch 70 to the spray device solenoid 83 and the coating operation begins. Let us assume that the holder moves in an upward direction. The coating continues until the wafer holder has traverse a path through the discharge jet and upon reaching a predetermined position the top limit switch 36 is closed by actuator 37. This action energizes R5 which closes contact R5A to energize R6 and reverse the direction of motor travel. R7 is simultaneously energized which locks itself and R6 across the line by closing contact R7A. Contact R5B completes the circuit through contact R4B and 59 to cause the holder to turn and simultaneously therewith, closing of R5B energizes R2 which opens contact R2A to disable the spray device. The turning action operates switch 72 to power the lock solenoid 69 after a predetermined rotation of the notch disc as previously described. The wafer holder now moves in the downward direction and the top limit switch opens upon removal of actuator therefrom, which opens contact R5B, deenergizes coil R2 and closes switch R2A initiating the jet for the travel. Upon arrival of the holder at the predetermined bottom position limit switch 35 is closed energizing coil R1 which opens normally closed contact R1A deenergizing coil R7 and removing energy from R6 and R7, which again reverses the motor travel. Contact R1A closes in response to actuation of the bottom limit switch thereby again energizing the rotary solenoid 59 to cause turning of the holder and energizing coil R2 to disable the spray gun during the turning and stopping motion. The holder reciprocating motion continues until a 360 degree turn has been completed by the indexing mechanism whereupon the normally closed cycle stop 65 is opened by the camming action of disc 63 which deenergizes R3 and the circuit reverts to the initial condition. Contacts R1B are closed by coil R1 which is energized by switch 35. Switch 35 is the lower limit switch and is closed by actuator 37 (see Fig. 3). When the mechanism is stopped in the lower position shown in Fig. 3 and power is applied, then R1B and R4A must be open or R4 would be energized and R4B would cause a rotation cycle. During the time of column travel from bottom to top R1A is closed. When upper limit switch 36 is actuated by cam 37, relay coil R5 is energized closing 5A and simultaneously energizing coils R6 and R7. Relay R7 locks through R7A and R1A which is closed due to cam 37 engaging switch 36.

If it is desired to permit the spray device to coat only on alternate path of travel whereby only opposed wafer surfaces are coated, as in Figure 13, then switch 70 is moved to the position opposed to that shown and the spray device is energized only when coil R7 is activated which will occur when the top limit switch 36 applies voltage to R5.

Figure 17 shows the pneumatic circuit used in the invention. Pressure is applied from line 75 and through trap 76 and regulator 77 to the material container 14 and through conduit 15 to the spray device 13. A line 78 parallel to the container divides through pressure regulator 79 to line 16 to supply discharge air to the device. An additional line 80 passes through regulator 81 trap 82 and spray device solenoid 83. Application of voltage to solenoid 83 permits air to flow through the valve and actuate the pneumatic trigger valve (not shown) in the spray device. This action results in a discharge jet from the orifice to coat articles presented thereto.

The form of the invention illustrated and described herein is typical and illustrative only and it is evident that the invention is capable of embodiment in other forms all falling within the scope of the appended claims which are to be broadly construed.

I claim:

1. In an apparatus for applying a coating to the edges of a plurality of planar wafers the combination comprising a spray device, an orifice formed in said device to direct the discharge jet, means for holding a series of wafers in contiguity to present the edges thereof to the said orifice, said holding means formed to shield the wafer edges in part at least from the discharge jet, means for reciprocating at a uniform rate said holding means in a plane spaced from said orifice, and means responsive to movement of said reciprocating means to a predetermined position to terminate the discharge jet and to rotate the said holding means to present a successive edge to the said spray device.

2. In a machine for affixing a coating to the edges of a plurality of rectangular wafers the combination comprising a spray device having an orifice to direct the discharge jet, a holder to receive a series of wafers to present the respective edges thereof to the orifice, means formed on said holder to shield a portion of the wafer edges from the jet, driving means to reciprocate at a uniform rate said holding means in a plane spaced from and opposed to the orifice, and means responsive to movement of said holder to a plurality of predetermined positions to terminate the discharge jet and to rotate the holder to present respective successive edges to the orifice.

3. In a machine for affixing a coating to selected edges of a plurality of wafers the combination comprising a spray device having an orifice to direct the discharge jet, a holder to receive a series of wafers to present the respective edges thereof to the orifice, means formed on said holder to shield a portion of the wafer edges from the jet, driving means to reciprocate at a uniform rate said holding means in a plane spaced from and opposed to the orifice, means responsive to movement of said holder to a plurality of predetermined positions to terminate the discharge jet and maintain the same inoperative during alternate paths of holder travel, and means to rotate the holder.

4. In a machine for affixing a coating on kerfs formed in the edges of a plurality of planar wafers the combination comprising a spray device, an orifice formed in said device to direct the discharge jet, a holder to receive a series of wafers to present the respective edge portions thereof to the orifice, the longitudinal center line through the orifice forming an acute angle with a line normal to an adjacent edge of a wafer, means formed on said holder to shield the wafer edge portions extending between juxtaposed kerfs from the jet, driving means to reciprocate at a uniform rate said holder in a plane spaced from and opposed to the orifice, means responsive to movement of said holder to a plurality of predetermined positions to terminate the discharge jet and to turn the holder to present successive respective edges to the orifice.

5. In a machine for affixing a coating on the boundary areas of a series of kerfs formed in the edges of planar wafers the combination comprising a spray device having an orifice to direct the discharge jet, a holder to receive a plurality of stacked wafers to present respective edge portions thereof to the orifice, means formed on said holder to shield the wafer edge portions extending between adjacent kerfs from the discharge jet, driving means to reciprocate said holder in a plane spaced from and opposed to the orifice, and means responsive to movement of said driving means to a plurality of predetermined positions to reverse the movement and to turn the holder to present successive edge portions to the orifice, said last named means including means to terminate the driving means movement and to disable the jet upon sensing movement reversals equal in number to the wafer edge portions being coated.

6. In a machine for affixing a coating on edge portions of a plurality of wafers the combination comprising a spray device having an orifice to direct the discharge jet, a holder to receive a series of wafers to present the respective edge portions thereof to the orifice, means formed on said holder to shield selected wafer edge portions, driving means to reciprocate said holder in a plane spaced from and opposed to the orifice, and a circuit including a plurality of spatially disposed limit switches responsive to the arrival of said driving means to reverse the movement and to turn the holder to present a successive edge portion to the orifice, said circuit including a switch connected to terminate movement of the driving means and to disable the discharge jet upon sensing motion reversals equal in number to the wafer edge portions to be coated.

7. In an apparatus for applying a coating to the exterior of multilateral objects the combination comprising a spray device having an orifice formed therein to direct the discharge jet, means for holding an array of objects to present a respective first edge to the orifice, means formed on said holding means to shield said objects in part at least from the discharge jet, means for reciprocating said holding means in a plane spaced from the orifice during operation of said spray device, and means responsive to the arrival of said reciprocating means in a plurality of predetermined positions to reverse the movement thereof and turn the holding means to present a second edge to the orifice, said last named means including means to disable said spray device during the turning cycle.

8. In a spraying apparatus, a supporting frame, a top structure carried by the supporting frame, a housing fixed to and depending from the undersurface of said top structure, a cylinder supported in the housing for axial reciprocating movement, a shaft rotatably mounted concentrically within the cylinder and extending above and below the same, power means mounted on the lower end of the cylinder for rotating said shaft in step-by-step movement, an article supporting structure mounted at the upper end of the shaft, power means for reciprocating said cylinder, means actuated by said cylinder for sequentially operating said power means, and a spray head supported on the top structure, said spray head having the axis of its nozzle intersecting the path of movement of the articles carried by said article supporting structure for coating the same during reciprocation of the cylinder.

9. The structure of claim 8 characterized in that the article supporting structure is detachably mounted at the upper end of the shaft.

10. The structure of claim 8 characterized in that a clamp member is carried by the upper end of the cylinder for engaging the articles supported on the article supporting structure.

11. The structure of claim 8 characterized in that the power means for reciprocating the cylinder includes a motor mounted on the housing, the motor driving gear engaging a rack carried by the cylinder.

12. The structure of claim 8 characterized in that the cylinder has fixed to its outer surface cams which actuate switches for controlling the power means, said switches being mounted on the housing and projecting through the housing for engaging the cam means.

13. The structure of claim 8 characterized in that the article supporting structure is formed with a recess at its upper surface for supporting an article holder, said article holder including elongated wall portions for defining exposed areas for receiving spray from the spray head.

References Cited in the file of this patent

UNITED STATES PATENTS

| | | |
|---|---|---|
| 2,162,317 | Rez | June 13, 1939 |
| 2,261,138 | Bullerjahn | Nov. 4, 1941 |
| 2,434,176 | Potthoff | Jan. 6, 1948 |
| 2,565,263 | Paasche | Aug. 21, 1951 |
| 2,622,554 | Eger et al. | Dec. 23, 1952 |